United States Patent [19]

Azuchi

[11] Patent Number: 4,584,626
[45] Date of Patent: Apr. 22, 1986

[54] ELECTRONIC COMPONENT HAVING ROTARY MECHANISM

[75] Inventor: Yukihiro Azuchi, Sabae, Japan

[73] Assignee: Murata Manufacturing Co., Ltd., Japan

[21] Appl. No.: 688,182

[22] Filed: Jan. 2, 1985

[30] Foreign Application Priority Data

Jan. 9, 1984 [JP] Japan .................................... 59-2350

[51] Int. Cl.⁴ ............................................. H01G 5/06
[52] U.S. Cl. ................................................... 361/293
[58] Field of Search ............................... 361/292, 293

[56] References Cited

U.S. PATENT DOCUMENTS

| 4,056,842 | 11/1977 | Sienicki et al. | 361/293 |
| 4,291,361 | 9/1981 | Shirakawa | 361/292 X |
| 4,500,941 | 2/1985 | Izumi | 361/293 |

FOREIGN PATENT DOCUMENTS

982167  2/1965  United Kingdom ................. 361/293

Primary Examiner—Donald A. Griffin
Attorney, Agent, or Firm—Ostrolenk, Faber, Gerb & Soffen

[57] ABSTRACT

An electronic component having a rotary mechanism provided with a rotor, including a stator member and a combination component for rotating the rotor such that the rotary mechanism is mounted on the stator member. The combination component includes a plate member formed with a slot and a spring member having an engageable piece engageable with a recess of the rotor so as to be rotated together with the rotor through engagement of the engageable piece of the spring member with the recess of the rotor.

8 Claims, 17 Drawing Figures

ELECTRONIC COMPONENT HAVING ROTARY MECHANISM

BACKGROUND OF THE INVENTION

The present invention generally relates to electronic components and more particularly, to an electronic component having a rotary mechanism provided with a metallic rotor, for example, a trimmer condenser, a variable condenser, a rotary switch, etc.

Conventionally, in trimmer condensers whose electrostatic capacity is adjusted by rotating, with the use of a screwdriver, etc., a metallic rotor mounted on a stator member, it has been so arranged that the metallic rotor is formed with a slot for receiving a tip of the screwdriver. Meanwhile, in order to rotate the rotor by inserting the tip of the screwdriver into the slot, a relatively large torque is required to be applied to the slot. Thus, the slot should be so formed as to have a large depth. Accordingly, the known trimmer condensers have such an inconvenience that it becomes necessary to perform a special machining in order to form such slot on the rotor, thereby resulting in rise of production cost thereof.

SUMMARY OF THE INVENTION

Accordingly, an essential object of the present invention is to provide an improved electronic component having a rotary mechanism, in which a rotor is rotatably mounted on a stator member so as to be rotated together with a combination component including a spring member and a driver plate coaxially secured to each other by crimping such that the rotor is rotated through the spring member of the combination component, with substantial elimination of the disadvantages inherent in conventional electronic components of this kind.

Another important object of the present invention is to provide an improved electronic component of the above described type which can be manufactured at low cost.

In accomplishing these and other objects according to one preferred embodiment of the present invention, there is provided an improved electronic component having a rotary mechanism provided with a rotor made of metal, including a stator member such that said rotary mechanism is mounted on said stator member, said electronic component comprising: a combination component for rotating said rotor, which includes a spring member and a plate member such that said spring member and said plate member are coaxially secured to each other by crimping; said spring member being formed by an elastic metal plate and being formed with at least one engageable piece; said plate member being substantially formed into a shape of a flanged cap so as to have a side wall and a flange portion and being formed with a slot extending from said side wall to said flange portion; said rotor being formed with at least one recess engageable with said engageable piece; said combination component being rotatably mounted, in an elastically deformed state, on said stator member so as to be rotated together with said rotor through engagement of said engageable piece with said recess.

In accordance with the present invention, since the rotor is rotated through the spring member of the combination component, the rotor can be rotated positively and stably even if the recess of the rotor is made small in depth.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
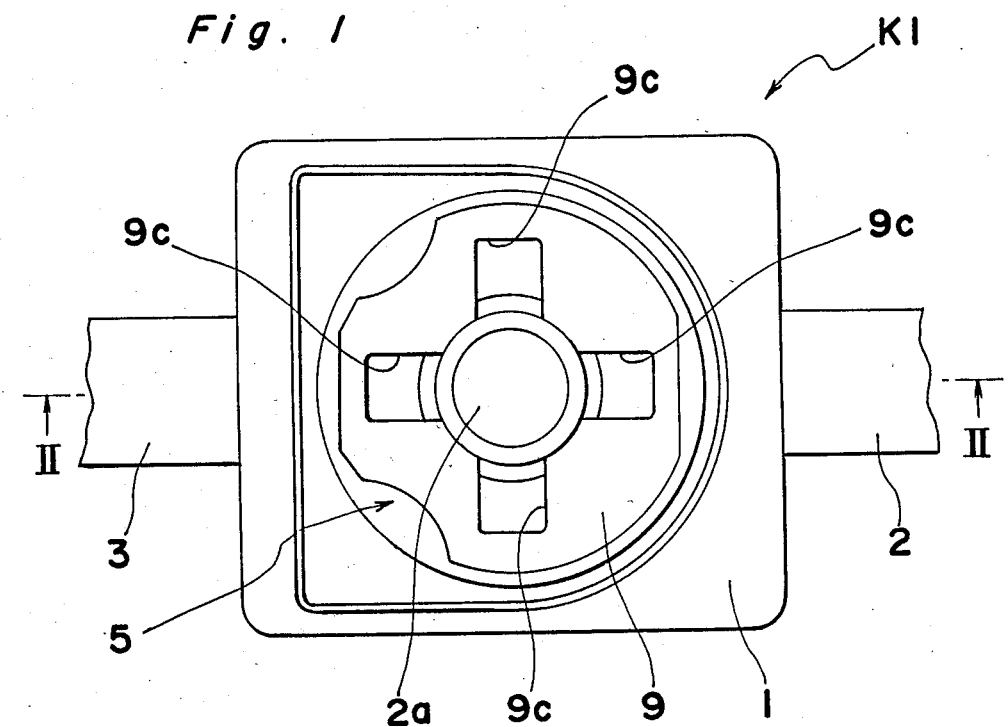
FIG. 1 is a top plan view of a trimmer condenser according to a first embodiment of the present invention.
Figure 2:
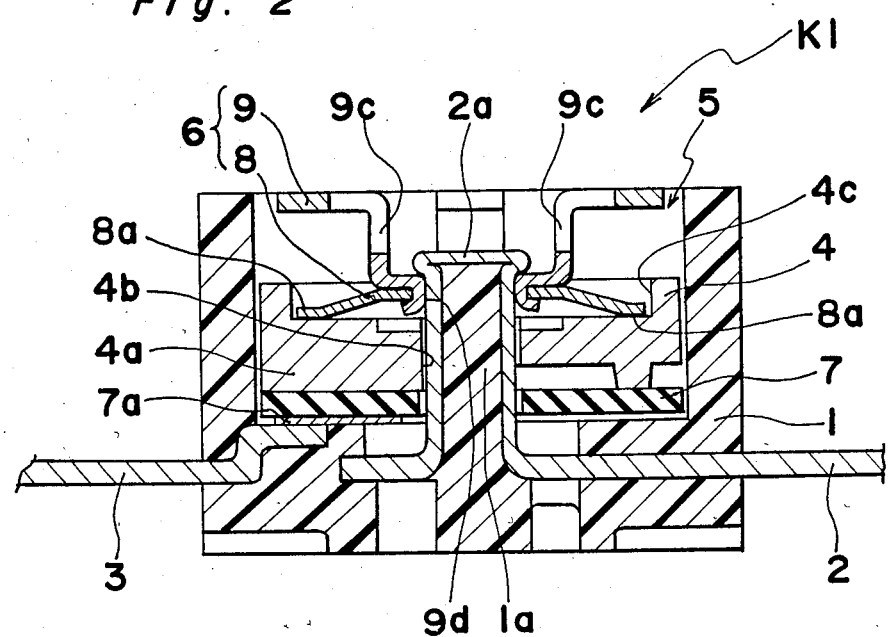
FIG. 2 is a cross-sectional view taken along the line I—II in FIG. 1.

Referring now to the drawings, there is shown in FIGS. 1 and 2, a trimmer condenser K1 according to a first embodiment of the present invention. The trimmer condenser K1 includes a casing 1 for accommodating a rotary mechanism and terminals 2 and 3 connected to the rotary mechanism such that the terminals 2 and 3 are molded integrally with the rotary mechanism. As shown in FIG. 2, the rotary mechanism includes a dielectric member 7, a rotor 4 and a combination component 6 for rotating the rotor 4, which are arranged upwardly in this order in FIG. 2. The casing 1 is made of thermosetting resin resistant to temperatures of about 300° C. or less. The terminal 2 has a closed-end tube portion 2a formed at one end thereof so as to be electrically connected to the rotor 4 as will be described later such that a shaft portion 1a of the casing 1 is fitted into the tube portion 2a, while the other end of the terminal 2 is extended out of the casing 1. The casing 1 is formed with an opening 5 and the rotary mechanism is provided in the opening 5.

Figure 3:
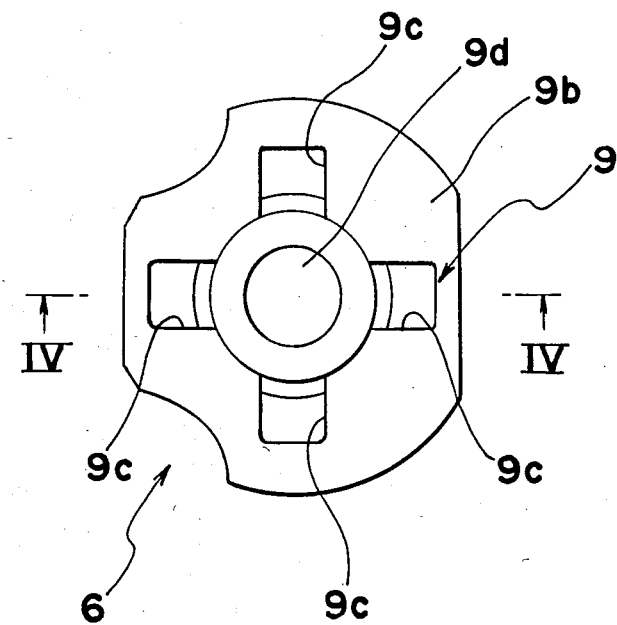
FIG. 3 is a top plan view of a combination component employed in the trimmer condenser of FIG. 1.
Figure 4:
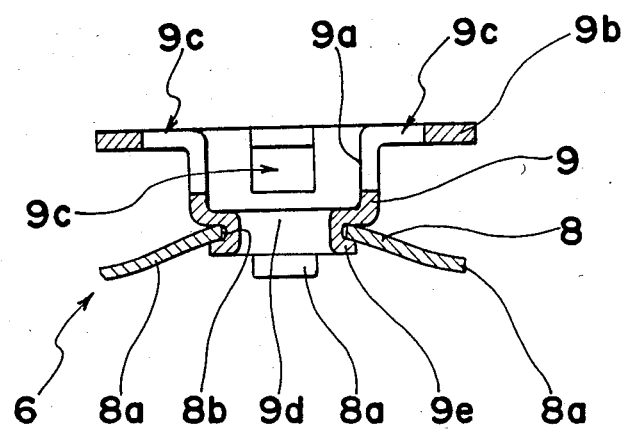
FIG. 4 is a cross-sectional view taken along the line IV—IV in FIG. 3.

In the rotary mechanism, the dielectric member 7 has a semicircular electrode conductor 7a formed at a lower face thereof and the electrode conductor 7a is electrically connected to one end of the terminal 3. The rotor 4 made of metal is placed on the upper face of the dielectric member 7 and has a semicircular electrode conductor 4a formed at a lower face thereof. Meanwhile, the rotor 4 has a through-hole 4b formed at a central portion thereof such that the tube portion 2a is passed through the through-hole 4b. The rotor 4 further has two pairs of opposite recesses 4c formed circumferentially at intervals of 90° on an upper face thereof and engageable with two pairs of opposite engageable pieces 8a of a spring member 8 of the combination component 6, respectively such that the recesses 4c are disposed in a crisscross shape. As shown in FIGS. 3 and 4, the combination component 6 is constituted by the spring member 8 and a driver plate 9 for receiving a tip of a screwdriver. The spring member 8 is formed by a plate made of elastic metal such as phosphor bronze, etc. and has a hole 8b formed at a central portion thereof by blanking. The two pairs of the opposite engageable pieces 8a of the spring member 8 extend diametrically outwardly and obliquely downwardly at intervals of 90°, i.e., in a crisscross shape such that one pair of the opposite engageable pieces 8a intersect with the other pair of the opposite engageable pieces 8a at right angles to each other. Meanwhile, the driver plate 9 is formed by a plate made of metal suitable for drawing, for example, stainless steel, and is obtained by drawing the plate into a shape of a flanged cap so as to have a side wall 9a and a flange portion 9b. Two pairs of opposite slots 9c for receiving a tip of a screwdriver are formed circumferentially at intervals of 90° on the driver plate 9 so as to extend from the side wall 9a to the flange portion 9b such that the slots 9c are disposed in a crisscross shape.

As shown in FIG. 4, the driver plate 9 further has a hole 9d formed at a central bottom portion thereof and a bent portion 9e obtained by crimping a lower peripheral portion of the hole 9d radially outwardly such that the driver plate 9 is secured to the spring member 8 by the bent portion 9e. As shown in FIG. 2, the combination component 6 is placed on the rotor 4 such that the engageable pieces 8a are fitted into the recesses 4c disposed in the crisscross shape. At the same time, the tub portion 2a of the terminal 2 is inserted through the through-hole 4b of the rotor 4 and the hole 9d of the driver plate 9 and then, the tube portion 2a is crimped so as to mount the combination component 6 and the rotor 4 on the casing 1 such that the combination component 6 is rotated together with the rotor 4. Since the distal end portions of the engageable pieces 8a of the spring member 8 depress the bottom portions of the recesses 4c of the rotor 4 downwardly, respectively, the rotor 4 is urged toward the dielectric member 7 by the engageable pieces 8a.

In the trimmer condenser K1 of the above described arrangement, electrostatic capacity of the trimmer condenser K1 is taken from between the terminals 2 and 3 and is determined by an area of overlap between the electrode conductor 4a of the rotor 4 and the electrode conductor 7a of the dielectric member 7. When the combination component 6 is rotated by fitting the tip of the screwdriver into the slots 9c, the rotor 4 is rotated together with the combination component 6, so that it becomes possible to change the area of overlap between the electrode conductors 4a and 7a confronting each other. At this time, the distal end portions of the engageable pieces 8a of the spring member 8 are elastically brought into pressing contact with the bottom portions of the recesses 4c of the rotor 4, respectively and thus, such a phenomenon does not take place that the engageable pieces 8a are disengaged from the recesses 4c even if the recesses 4c are made small in depth.

Accordingly, since depth of the recesses 4c of the rotor 4 can be made small, it becomes possible to form the recesses 4c by employign inexpensive machining methods such as coining, etc. Meanwhile, the combination component 6 is constituted by the spring member 8 and the driver plate 9. The spring member 8 can be made of elastic metal such as phosphor bronze, etc. A rotational torque for rotating the rotor 4 is remarkably stablized by an urging force of the engageable pieces 8a of the spring member 8 exerted on the rotor 4. In the above embodiment, although the stator member of the trimmer condenser K1 is constituted by the casing 1 and the dielectric member 7 of the rotary mechanism, it can be also so arranged that the stator member is constituted by the dielectric member 7 only.

Furthermore, although the combination component 6 is mounted on the casing 1 by crimping the tube portion 2a of the terminal 2 in the above embodiment, it can be also so arranged that a retainer plate (not shown) for retaining the combination component 6 is provided in the opening 5 of the casing 1 instead of crimping the tube portion 2a.

Moreover, although the two pairs of the opposite recesses 4c are formed on the rotor 4 in the above embodiment so as to be disposed in the crisscross shape, it can be also so arranged that only one pair of the opposite recesses 4c are formed on the rotor 4. In this case, it is needless to say that the spring member 8 is required to be provided with only one pair of the opposite engageable pieces 8a.

In addition, the present invention is not restricted, in its application, to the trimmer condenser but can be applied to various electronic components each provided with a casing having a rotary mechanism accommodated therein, such as a variable condenser, a rotary switch, etc.

As is clear from the foregoing description, in the electronic component including the metal rotor, according to the present invention, since the combination component for rotating the rotor and the rotor are rotatably mounted on the casing through engagement of the engageable pieces of the spring member of the combination component with the recesses of the rotor such that the combination component is rotated together with the rotor, the engageable pieces of the spring member elastically depress the bottom portions of the rotor at all times, respectively. Thus, even if the recesses of the rotor are made small in depth, such a phenomenon does not take place that the engageable pieces of the spring member are disengaged from the recesses of the rotor with the result that the driver plate of the combination component is projected out of the opening of the casing. Accordingly, it becomes possible to form the recesses of the rotor by employing inexpensive machining methods such as coining, etc.

Furthermore, in accordance with the present invention, optimum metallic materials can be selected for the spring member and the driver plate of the combination component on the basis of the respective functions and the machinability. Since the spring member is made of elastic metal, the rotational torque for rotating the rotor can be stabilized by the urging force of the spring member and thus, performances of the electronic component are improved.

Figure 5:
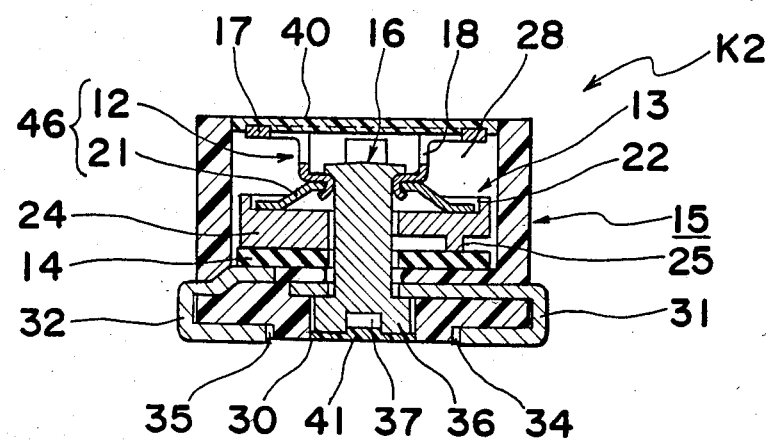
FIG. 5 is a view similar to FIG. 2, particularly showing a trimmer condenser according to a second embodiment of the present invention.
Figure 6:
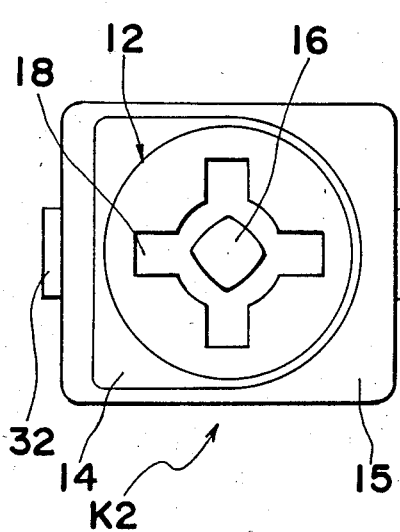
FIG. 6 is a top plan view of the trimmer condenser of FIG. 5.
Figure 8:
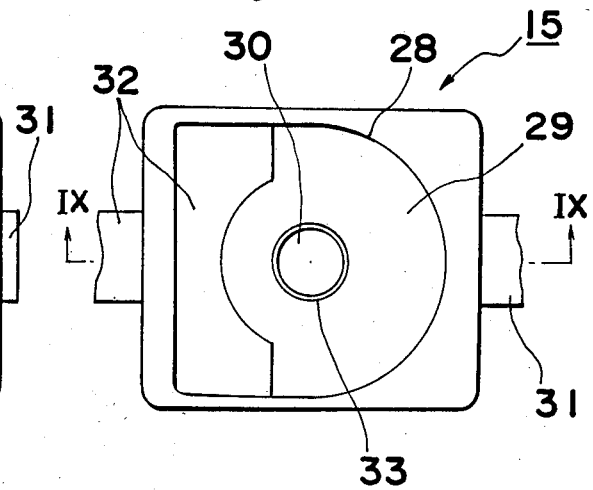
FIG. 8 is a top plan view of a casing employed in the trimmer condenser of FIG. 5.
Figure 9:
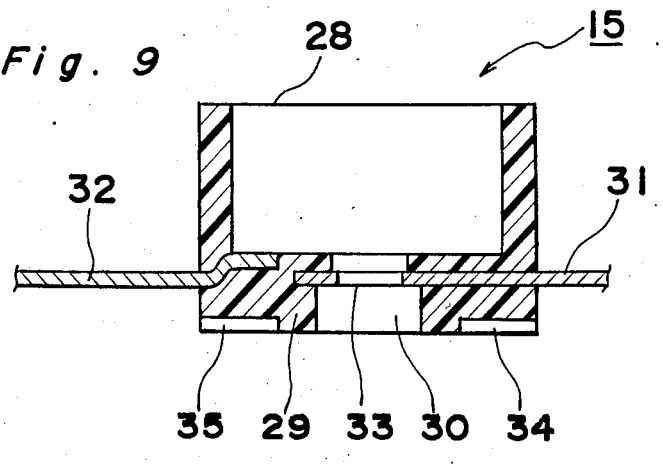
FIG. 9 is a cross-sectional view taken along the line IX—IX in FIG. 8.
Figure 7:
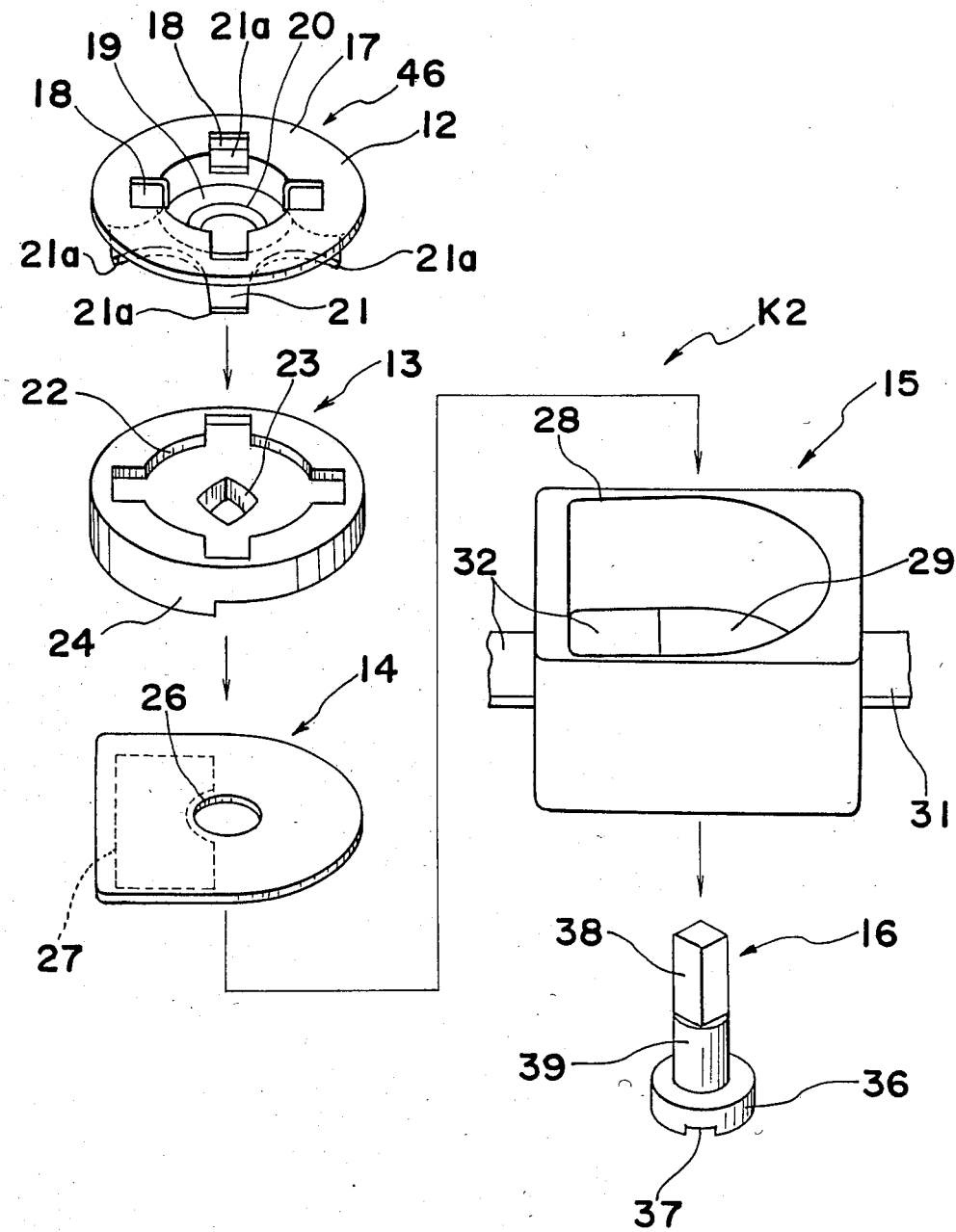
FIG. 7 is an an exploded perspective view of the trimmer condenser of FIG. 5.

Referring to FIGS. 5 to 9, there is shown a trimmer condenser K2 according to the second embodiment of the present invention. As shown in FIGS. 7 to 9, the trimmer condenser K2 includes a rotor 13 made of metal, a dielectric member 14, a combination component 46, a casing 15 and a central shaft 16. It is to be noted that the rotor 13 is arranged to be rotated not only from above the casing 15 but also from below the casing 15 in the trimmer condenser K2 as will be seen below. The combination component 46 is constituted by a spring member 21 and a driver plate 12. The driver plate 12 has four slots 18 formed at intervals of 90° on a disk portion 17 thereof and a hole 20 formed on a bottom wall 19 thereof. The spring member 21 has two pairs of opposite engageable pieces 21a extending outwardly of the bottom wall 19 and obliquely downwardly at intervals of 90°, i.e., in a crisscross shape.

The rotor 13 is substantially of a shape of a disk and has two pairs of opposite recesses 22 formed circumferentially at intervals of 90°, i.e., in a crisscross shape, on an upper face thereof such that the engageable pieces 21a of the spring member 21 are engaged with the recesses 22, respectively. The rotor 13 further has a through-hole 23 of a substantially square cross section formed at a central portion thereof. The rotor 13 has a rotor electrode 24 of a substantially semicircular shape formed on one side of a lower face thereof. As shown in FIG. 5, a step portion 25 is formed on the other side of the lower face of the rotor 13 so as to place the rotor 13 on the dielectric member 14 stably.

Meanwhile, the dielectric member 14 made of any dielectric material is of a shape of a rectangle having a semicircle formed at one side thereof and has a circular through-hole 26 formed at a central portion thereof. The dielectric member 14 further has a stator electrode 27 formed on a lower face thereof as shown in broken lines in FIG. 7. The casing 15 made of electrically insulating and heat resistant resin has an upper opening 28 formed at an upper face thereof and the upper opening 28 is of a size substantially equal to that of the dielectric member 14. When the dielectric member 14 is placed in the upper opening 28, the dielectric member 14 is prevented from rotating relative to the casing 15 through engagement of the dielectric member 14 with the upper opening 28. The casing 15 further has a lower opening 30 formed at a central portion of a bottom wall 29 thereof.

In FIGS. 5 to 9, a rotor terminal 31 and a stator terminal 32 are embedded in the bottom wall 29 of the casing 15. When the casing 15 is molded, the rotor terminal 31 and the stator terminal 32 are inserted into a die for molding the casing 15 and thus, are molded integrally with the casing 15. As shown in FIG. 9, the rotor terminal 31 is formed with a hole 33 coaxial with the lower opening 30 of the casing 15. The hole 33 has a diameter smaller than that of the lower opening 30. Meanwhile, the stator terminal 32 is partially exposed on the bottom wall 29 in the casing 15. As shown in FIGS. 7 to 9, the rotor terminal 31 and the stator terminal 32 are extended outwardly in opposite directions during manufacture of the trimmer condenser K2. However, when the manufacture of the trimmer condenser K2 has been completed as shown in FIG. 5, the rotor terminal 31 and the stator terminal 32 are bent inwardly toward each other so as to extend to the lower face of the casing 15. Thus, recesses 24 and 25 for receiving the rotor terminal 31 and the stator terminal 32, respectively are formed on the lower face of the casing 15.

The central shaft 16 made of metal is of a shape similar to that of a rivet. The central shaft 16 has a head portion 36 of a large diameter formed at a bottom portion thereof. A slot 37 for receiving the tip of the screwdriver is formed on a lower face of the head portion 36. The central shaft 6 has an upper shank portion 38 having a square cross section and a lower shank portion 39 having a circular cross section. The upper shank portion 38 is fitted into the through-hole 23 of the rotor 13 so as to be engaged therewith by rotating the central shaft 16. The lower shank portion 39 is disposed at the through-hole 26 of the dielectric member 14 and the lower opening 30 of the casing 15.

Hereinbelow, assembly of the trimmer condenser K2 will be described. Initially, the central shaft 16 is fitted into the lower opening 30 from below the casing 15. Then, the dielectric member 14, the rotor 13 and the combination component 46 are sequentially fitted around the central shaft 16 in the upper opening 28 of the casing 15. Thereafter, an upper end portion of the central shaft 16 is crimped. Thus, the dielectric member 14, the rotor 13 and the combination component 46 are elastically held between the crimped upper end portion of the central shaft 16 and the bottom wall 29 by an elastic force of the engageable pieces 21a of the spring member 21. At this time, it can be so arranged as shown in FIG. 6 that cover sheets 40 and 41 are formed on the upper opening 28 and the lower opening 30 of the casing 16 so as to cover the upper opening 28 and the lower opening 30, respectively. The cover sheets 40 and 41 are made of such resin as to be readily fractured by the tip of the screwdriver when the rotor 13 is rotated by using the screwdriver. The cover sheets 40 and 41 provide a sealed construction of the trimmer condenser K2 so as to prevent the trimmer condenser K2 from being soiled. Finally, the rotor terminal 31 and the stator terminal 32 are cut to a proper length and then, bent into the recesses 34 and 35 of the casing 15, respectively as described earlier.

When the trimmer condenser K2 has been assembled as described above, the head portion 36 of the central shaft 16 is held in contact with the rotor terminal 31 so as to be electrically connected thereto. Meanwhile, the central shaft 16 is electrically connected to the rotor 13 directly or indirectly through the combination component 46. It is to be noted that the lower face of the head portion 36 of the central shaft 16 is disposed above the lower face of the casing 15 so as to be retracted in the lower opening 30. Meanwhile, in the casing 15, the stator terminal 32 is held in contact with the stator electrode 27 formed on the lower face of the dielectric member 14 so as to be electrically connected to the stator electrode 27.

In accordance with the trimmer condenser K2, since the central shaft is rotatably secured in the casing through engagement of the central shaft with the rotor and can be rotated from below the casing, it is possible to rotate the rotor not only from above the casing but from below the casing, whereby it becomes possible to adjust electrostatic capacity of the trimmer condenser not only from above the casing but from below the casing.

Figure 10:
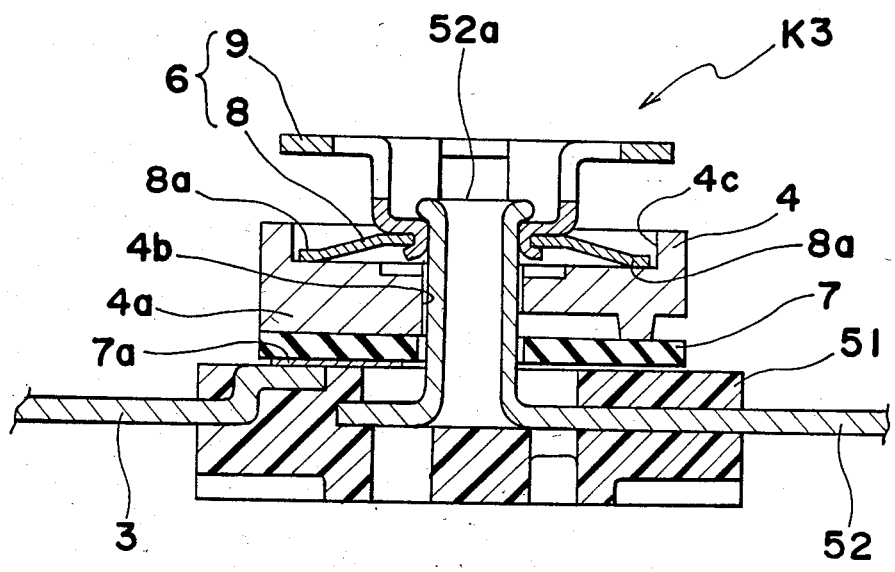
FIG. 10 is a view similar to FIG. 5, particularly showing a trimmer condenser according to a third embodiment of the present invention.

Referring now to FIG. 10, there is shown a trimmer condenser K3 according to a third embodiment of the present invention. The trimmer condenser K3 includes a casing 51 and a terminal 52 in place of the casing 1 and the terminal 2 of the trimmer condenser K1, respectively. Since the casing 51 is not formed with the opening 5 of the trimmer condenser K so as to have a shape of a plate, the dielectric member 7, the rotor 4 and the combination component 6 are not accommodated in the casing 51 but are only placed on the casing 51. Meanwhile, the terminal 52 is formed with an open-ended tube portion 52a in place of the closed-end tube portion 2a of the terminal 2 of the trimmer condenser K1.

Figure 11:
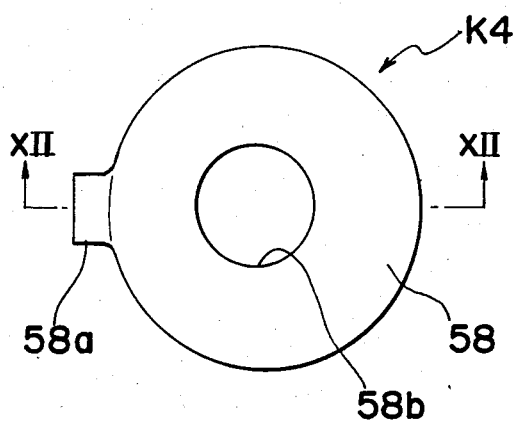
FIG. 11 is a top plan view of a spring member employed in a trimmer condenser according to a fourth embodiment of the present invention.
Figure 12:
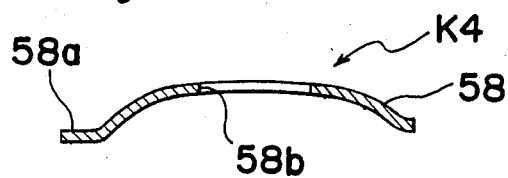
FIG. 12 is a cross-sectional view taken along the line XII—XII in FIG. 11.
Figure 13:
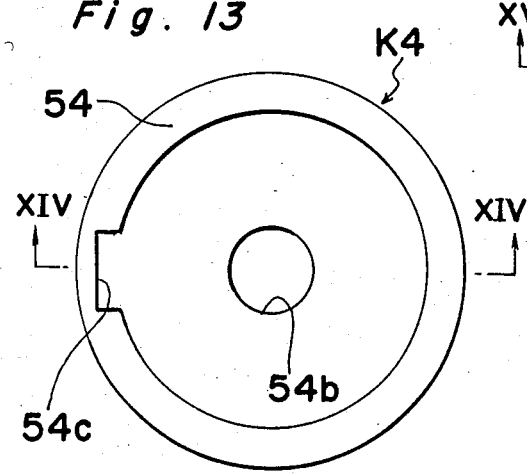
FIG. 13 is a top plan view of a rotor employed in the trimmer condenser of FIG. 11.
Figure 14:
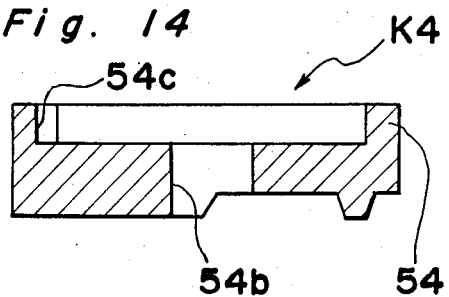
FIG. 14 is a cross-sectional view taken along the line XIV—XIV in FIG. 13.

Referring further to FIGS. 11 to 14, there are shown a spring member 58 of a circular shape and a rotor 54 which are employed in a trimmer condenser K4 according to a fourth embodiment of the present invention. As shown in FIGS. 11 and 12, the spring member 58 has an engageable piece 58a formed at an outer peripheral portion thereof and a hole 58b formed at a central portion thereof. Meanwhile, as shown in FIGS. 13 and 14, the rotor 54 is formed with a through-hole 54b and a recess 54c for receiving the engageable piece 58a.

Figure 15:
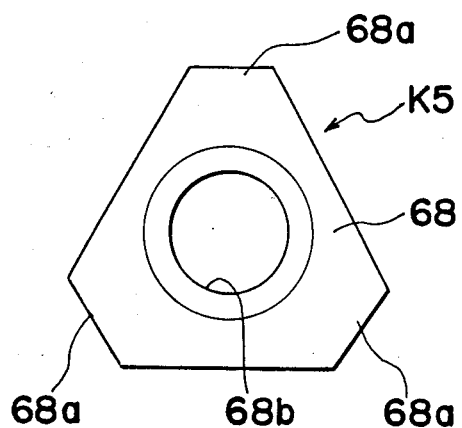
FIG. 15 is a top plan view of a spring member employed in a trimmer condenser according to a fifth embodiment of the present invention.
Figure 16:
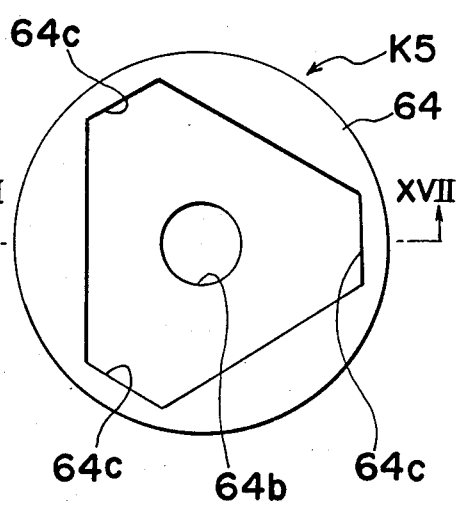
FIG. 16 is a top plan view of a rotor employed in the trimmer condenser of FIG. 15.
Figure 17:
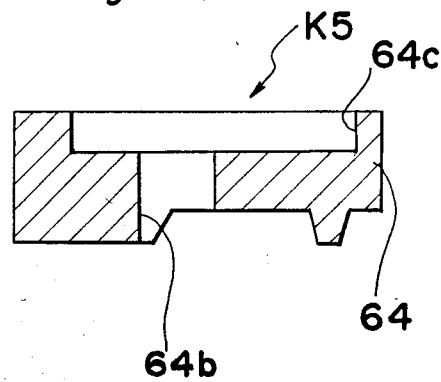
FIG. 17 is a cross-sectional view taken along the line XVII—XVII in FIG. 16.

Referring finally to FIGS. 15 to 17, there are shown a spring member 68 of a substantially triangular shape and a rotor 64 which are employed in a trimmer condenser K5 according to a fifth embodiment of the present invention. As shown in FIG. 15, the spring member 68 has three engageable pieces 68a formed at three apexes thereof, respectively and a hole 68b formed at a central portion thereof. Meanwhile, as shown in FIGS. 16 and 17, the rotor 64 is formed with a through-hole 64b and three recesses 64c for receiving the engageable pieces 68a, respectively. Since other constructions of the trimmer condensers K3, K4 and K5 are similar to those of the trimmer condenser K1, detailed description thereof is abbreviated for the sake of brevity.

In accordance with the trimmer condensers K3 to K5, since the combination component is rotated together with the rotor through elastic engagement of the engageable piece of the spring member of the combination component with the recess of the rotor in the same manner as in the trimmer condenser K1, the engageable piece is prevented from being disengaged from the recess of the rotor even if the recess of the rotor is made small in depth.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An electronic component having a rotary mechanism provided with a rotor made of metal, including a stator member such that said rotary mechanism is mounted on said stator member, said electronic component comprising:
a combination component for rotating said rotor, which includes a spring member and a plate member such that said spring member and said plate member are coaxially secured to each other by crimping;
said spring member being formed by an elastic metal plate and being formed with at least one engageable piece;
said plate member being substantially formed into a shape of a flanged cap so as to have a side wall and a flange portion and being formed with a slot extending from said side wall to said flange portion;
said rotor being formed with at least one recess engageable with said engageable piece;
said combination component being rotatably mounted, in an elastically deformed state, on said stator member so as to be rotated together with said rotor through engagement of said engageable piece with said recess.

2. An electronic component as claimed in claim 1, wherein said slot of said plate member is so formed as to receive a tip of a screwdriver.

3. An electronic component as claimed in claim 2, wherein said spring member is formed with two pairs of opposite engageable pieces such that one pair of said opposite engageable pieces intersect with the other pair of said opposite engageable pieces substantially at right angles to each other,
said rotor being formed with two pairs of opposite recesses engageable with said opposite engageable pieces, respectively.

4. An electronic component as claimed in claim 2, wherein said spring member has a circular shape and is formed, at an outer peripheral portion thereof, with said engageable piece engageable with said recess of said rotor.

5. An electric component as claimed in claim 2, wherein said spring member has a triangular shape and is formed, at three apexes thereof, with three engageable pieces, respectively,
said rotor being formed with three recesses engageable with said engageable pieces, respectively.

6. An electronic component as claimed in claim 1, wherein said spring member is formed with two pairs of opposite engageable pieces such that one pair of said opposite engageable pieces intersect with the other pair of said opposite engageable pieces substantially at right angles to each other,
said rotor being formed with two pairs of opposite recesses engageable with said opposite engageable pieces, respectively.

7. An electronic component as claimed in claim 1, wherein said spring member has a circular shape and is formed, at an outer peripheral portion thereof, with said engageable piece engageable with said recess of said rotor.

8. An electric component as claimed in claim 1, wherein said spring member has a triangular shape and is formed, at three apexes thereof, with three engageable pieces, respectively,
said rotor being formed with three recesses engageable with said engageable pieces, respectively.

* * * * *